(12) United States Patent
Bissoli

(10) Patent No.: US 9,242,403 B2
(45) Date of Patent: Jan. 26, 2016

(54) THERMOFORMING PRESS AND THERMOFORMING PROCESS

(71) Applicant: Giancarlo Bissoli, Verona (IT)

(72) Inventor: Giancarlo Bissoli, Verona (IT)

(73) Assignee: OMV MACHINERY S.R.L. (IT)

( * ) Notice: Subject to any disclaimer, the term of this patent is extended or adjusted under 35 U.S.C. 154(b) by 519 days.

(21) Appl. No.: 13/660,138

(22) Filed: Oct. 25, 2012

(65) Prior Publication Data

US 2013/0113137 A1     May 9, 2013

(30) Foreign Application Priority Data

Oct. 27, 2011    (IT) ............................. VR2011A0198

(51) Int. Cl.
    *B29C 51/08*     (2006.01)
    *B29C 51/22*     (2006.01)
    *B29C 51/44*     (2006.01)
    *B29C 51/10*     (2006.01)

(52) U.S. Cl.
    CPC ................. *B29C 51/08* (2013.01); *B29C 51/22* (2013.01); *B29C 51/44* (2013.01); *B29C 51/10* (2013.01)

(58) Field of Classification Search
    CPC ........ B29C 51/08; B29C 51/22; B29C 51/44; B29C 51/10
    USPC ........... 264/322, 297.7, 551; 425/345, 348 R, 425/261, 408, 412, 349, 422–423, 403
    See application file for complete search history.

(56) References Cited

U.S. PATENT DOCUMENTS

| | | | |
|---|---|---|---|
| 3,026,566 A * | 3/1962 | Martelli et al. | 425/190 |
| 5,182,065 A * | 1/1993 | Piotrowski et al. | 264/153 |
| 5,650,110 A | 7/1997 | Padovani | 264/153 |
| 5,869,110 A * | 2/1999 | Ogihara | 425/526 |
| 5,919,496 A * | 7/1999 | Padovani | B29C 57/12 264/296 |
| 6,042,360 A * | 3/2000 | Padovani | B29C 51/44 264/294 |
| 6,454,906 B1 * | 9/2002 | Nonomura | D21J 3/10 162/220 |

(Continued)

FOREIGN PATENT DOCUMENTS

| | | |
|---|---|---|
| EP | 2 292 410 A2 | 3/2011 |
| NL | 1 004 852 | 6/1998 |

OTHER PUBLICATIONS

Search Report dated Jun. 4, 2012 issued in corresponding Italian Patent Application No. VR2011A000198 (with English translation)(9 pages).

(Continued)

*Primary Examiner* — Joseph S Del Sole
*Assistant Examiner* — Nahida Sultana
(74) *Attorney, Agent, or Firm* — Ostrolenk Faber LLP

(57) ABSTRACT

A press for thermoforming a thermoformable sheet material for obtaining at least one thermomolded object, which has a support base; a pair of female molds supported for rotation around a rotation axis on the support base, diametrically opposite with respect to the rotation axis, drive means for the pair of female molds, comprising a rotary motion source designed to drive a power drive shaft and transmission means designed to transmit the motion from the power drive shaft to the pair of female molds, whereby between power drive shaft and female mold pair there is an angular displacement ratio of an angle greater than 360°, preferably 405°/180°, in order to make the female mold pair complete a sequence of 180° angular travels, thereby angularly and sequentially move each female mold into a molding position, and into a discharge position.

20 Claims, 11 Drawing Sheets

(56) References Cited

U.S. PATENT DOCUMENTS

| | | | |
|---|---|---|---|
| 6,756,090 B1* | 6/2004 | Westerlund | B29C 49/0047 264/257 |
| 8,366,436 B2* | 2/2013 | Parrinello et al. | 425/538 |
| 8,794,954 B2* | 8/2014 | Aldigeri | 425/261 |
| 2002/0104356 A1* | 8/2002 | Narushima | B21B 1/024 72/184 |
| 2003/0232176 A1* | 12/2003 | Polk, Jr. | B29C 31/047 428/167 |
| 2004/0221981 A1* | 11/2004 | Beale | B22D 5/02 164/323 |
| 2006/0233904 A1* | 10/2006 | Mattice et al. | 425/348 R |
| 2008/0263942 A1* | 10/2008 | Hansen | A01G 9/021 47/65.5 |
| 2010/0024879 A1* | 2/2010 | Richter et al. | 136/256 |

OTHER PUBLICATIONS

Search Report dated Jan. 31, 2013 issued in corresponding European Patent Application No. 12189515.5.

* cited by examiner

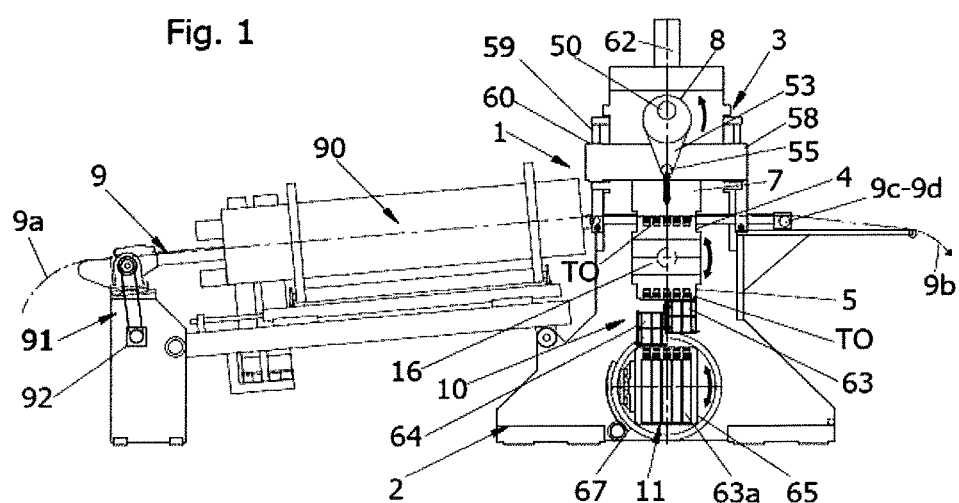

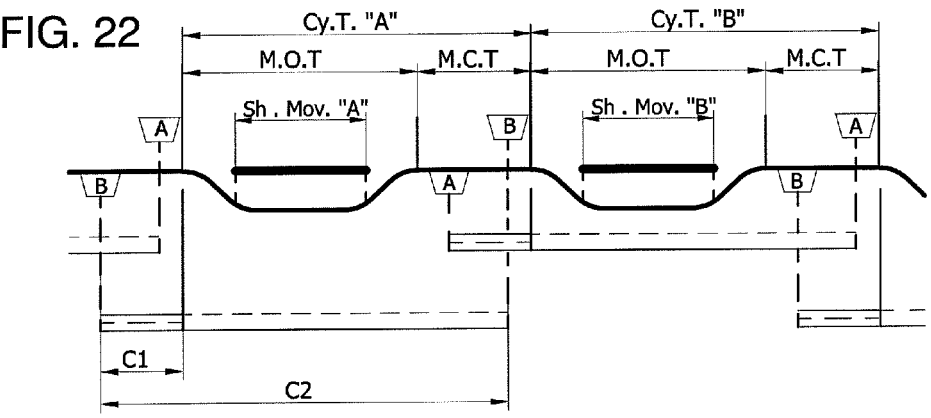
FIG. 22 — RECTILINEAR MOVEMENT "shuttle system"
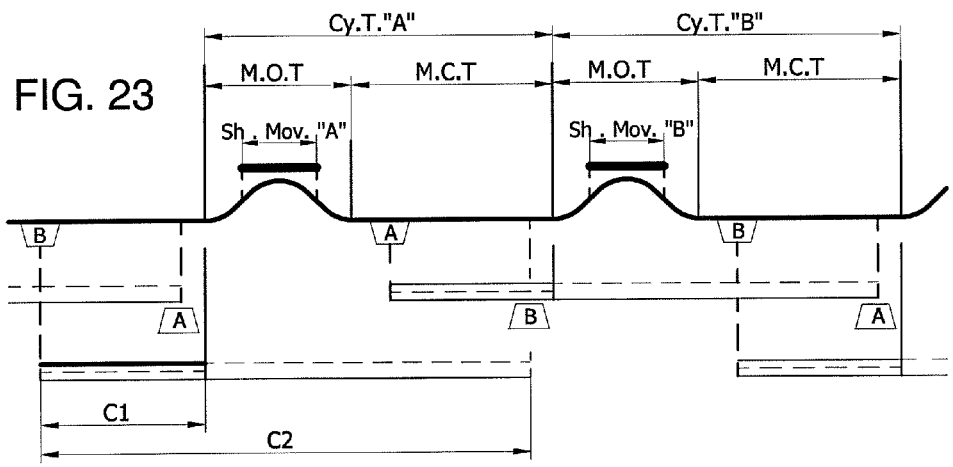
FIG. 23 — ROTARY MOVEMENT "shuttle system"

THERMOFORMING PRESS AND THERMOFORMING PROCESS

FIELD OF INVENTION

The invention regards a press for thermoforming a thermoformable sheet material (in jargon also called "foil") in order to obtain an object or mold of thermoformed hollow objects and a thermoforming process that can be obtained with such press.

BACKGROUND OF THE INVENTION

At the state of the art, various types of thermoforming presses have already been proposed, which are equipped with mutually engageable and disengageable male and female molds with mutual frontal opening-closing movement for the extraction of the thermoformed objects cut (i.e. severed from the foil) in the mold, after opening the molds and for feeding new sheet material between them. This is carried out with male and female molds that can be frontally brought close together-moved away from each other, or it can be carried out with a female mold that can move laterally to-and-fro (rectilinear movement or shuttle system) with respect to the male mold after the opening of the molds, or with female mold that can be moved angularly back-and-forth by about 75-90° (tilting movement) with respect to the male mold. In any case, the male mold can carry out a linear opening-closing movement, whereas the female mold is moved between a molding position in which it is situated at the male mold and is ready to receive the latter with the interposition of thermoformable sheet material, in order to carry out an operation of thermoforming of the sheet and cutting of the object or mold of objects in the female mold due to the action of the male mold—and an extraction or discharge position, in which the female mold is removed from the male mold and the thermoformed object or mold of thermoformed objects is extracted from the female mold and removed. The object or mold of objects must be cut off or separated from the foil via cutting off or cutting inside the female mold or outside the mold after the extraction from the female mold.

The abovementioned technical solutions (shuttle system or tilting movement system) provide that the thermoformed object or mold of thermoformed objects must be separated from the foil inside the female thermoforming mold, so as to be able to proceed first with the extraction from the mold and then to the subsequent stacking of the objects themselves. Other technical solutions are known, according to which the thermoformed objects are extracted from the mold while they are still fully or partly attached to the scrap of the foil and are later separated from the scrap outside the mold. The separation techniques outside the mold are not applicable to the present invention, however.

In the Dutch patent NL-1 004 852, a method and a press are disclosed for obtaining bowl covers starting from sheet material with the use of a male mold and two female molds with a single forming seat, which are arranged opposite each other (possibly supported by an intermediate mold-holder) and designed to rotate step-by-step, each time through 180°. In such a manner, the female molds (termed counter-molds in the above patent) are angularly moved in sequence between a molding position close to and opposite the male mold and a position of extraction of the molded object (bowl cover) far from and diametrically opposite the male mold. A suitable extractor device penetrates into the female mold situated in extraction position, in order to engage and extract the bowl cover molded therein, whereas at the same time in the other female mold, a molding operation is carried out for obtaining another bowl cover, and so forth.

More particularly, the patent NL-1 004 852 provides that the sheet material be already cut before being fed between the male and female molds by lateral belt conveyor means, until it is positioned centered with respect to the molds. The sheet is then completely "taken off" via sliding on the lateral belts due to the action of the male mold during the mold closing step. Since it is already cut-to-size, the entire sheet is used for being shaped as a bowl cover. No operation of shearing or separating of the bowl cover from the scrap is required. The function of the molds is exclusively that of forming the sheet, and therefore the structure of the molds, which must support and resist the closing forces of the same, does not have to be very strong—it can have small bulk and height limited to the size of the bowl cover to be obtained; hence, it does not require high non-deformability characteristics under stress, necessary for ensuring high-precision coupling between the cutting elements inside the molds.

However, this is a solution with extremely low productivity, for a series of reasons. First of all, molds are provided with a single forming impression. Secondly, considering the torsion moments required in order to angularly move the female molds, the coupling between motion source (electric motor) and load, which in the patent NL-1 004 852 is illustrated to be direct, requires employing a very large electric motor capable of developing torques of considerable size in the acceleration and deceleration steps; this is necessary in order to overcome the inertia of the sum of the masses (both of the molds and of the rotor of the motor), and also involves undesired phenomena due to the "over-shunting" effect which even in the most sophisticated control systems still manifests itself at the stop arrival positions of the female molds. Thirdly, after a thermoforming operation, in order to be able to carry out a subsequent feed of a sheet to be thermoformed, it is necessary to wait for the rotating molds to complete their angular displacement, which involves a considerable delay in the cycle time.

According to the versions of thermoforming machines with the highest productivity currently available on the market, which use the technique of thermoforming and shearing in the mold, at most 40 molding cycles per minute are obtained when objects are thermoformed/sheared in the mold which require an active or closure time interval of the molds of about 450 msec. These speed values are obtainable with thermoforming presses having width ranging between 740 and 780 mm and thickness of the female molds ranging between 420 and 480 mm, i.e. with so-called "average-size" molds. On the other hand, there is the increasing need to be able to arrange thermoforming presses suitable for ensuring decidedly much higher productivity levels.

SUMMARY OF THE INVENTION

The main object of the present invention is to provide a newly-conceived thermoforming press with average size suitable for molding a multiplicity of hollow object types, both of so-called disposable type and for packaging, in a thermoformable sheet material, such as polystyrene (PS), polypropylene (PP), partly-regenerated polyethylene terephthalate (Apet), biopolymer materials coming from renewable sources, such as polylactic acid (PLA), with very high production over time, so as to carry out up to 57 cycles/min without a problem, with a closed mold time of 450 msec.

Another object of the present invention is to provide a thermoforming press with relatively simple structure and operation, so as to be advantageous also with respect to the manufacturing and running costs.

Another object of the present invention is to provide a new thermoforming process, which allows carrying out a very quick and contactless extraction of the thermoformed objects from the female thermoforming mold.

According to a first aspect of the invention, a thermoforming press is provided for a thermoformable sheet material for obtaining at least one thermoformed object, which has
   a support base;
   a pair of female molds—supported for rotation around a rotation axis on said support base, the female molds of the pair having at least one thermoforming cavity obtained therein, such molds being arranged diametrically opposite with respect to said rotation axis,
   drive means for said pair of female molds, which comprise
      a reversible rotary motion source designed to drive a primary power drive shaft and
      transmission means designed to transmit the motion from the primary power drive shaft to a secondary shaft designed to drive said pair of female molds, in a manner such that between the primary power drive shaft and said secondary shaft there is an angular displacement ratio of an angle greater than 360°, preferably 405°/180°, in order to make the female mold pair complete a sequence of angular travels alternating 180°, thereby angularly moving each female mold into a molding position, at which at least one portion of said sheet material is thermoformed into a respective hollow object, and into a discharge position for the extraction of said
      at least one thermoformed object;
   a support frame being extended from said support base;
   a male mold movably supported in said support frame at said pair of female molds and having at least one molding pad element for a respective thermoforming cavity provided in each female mold; and
drive means for the male mold designed to move it open-closed in sync with the angular travels of said female mold pair, thereby making it sequentially engage with a female mold when this stops in said upper molding position and to remove it from the female mold before the angular displacement of the latter towards the lower discharge position.

According to another aspect of the present invention, a process is provided for thermoforming a thermoformable sheet material, for obtaining thermoformed objects by means of the above-described thermoforming press, the method comprising
   intermittent feeding of sheet material between a female mold in molding position and the male mold in a position removed from the female mold;
   moving the male mold close to the female mold and simultaneously thermoforming following the deformation action on the sheet material forced by the male mold to penetrate inside at least one of the thermoforming cavities in the female mold;
   moving the male mold away from the female mold;
   the angular travel of 180° of the female mold pair around its rotation axis, by means of the transmission means of the drive means, in order to transfer the female mold with the thermoformed objects housed therein into its discharge position, diametrically opposite the molding position, and simultaneously transfer the other female mold of the female mold pair into its molding position, the simultaneous feeding of new thermoformable sheet material between the male mold in removed position and the female mold arriving towards the molding position;
   discharging the thermoformed objects from the mold in discharge position; and
   starting a new thermoforming cycle.

BRIEF DESCRIPTION OF THE DRAWINGS

Further characteristics and advantages of the present invention will be clearer from the following detailed description of a currently preferred embodiment thereof, such description being made with reference to the accompanying drawings, in which:

FIG. 1 is a diagrammatic side elevation, sectional view along a vertical plane of a thermoforming press according to the present invention coupled to a sheet material heating and feeder group;

FIG. 2 shows a side elevation view on an enlarged scale of the press of FIG. 1;

FIG. 22 shows two subsequent working cycles of a thermoforming process performed by a thermoforming press of the state of the art;

FIG. 23 shows two subsequent working cycles of a thermoforming process according to the present invention.

In the accompanying drawings, the same or similar components are indicated with the same reference numbers.

DETAILED DESCRIPTION OF THE PREFERRED EMBODIMENTS

Figure 3:
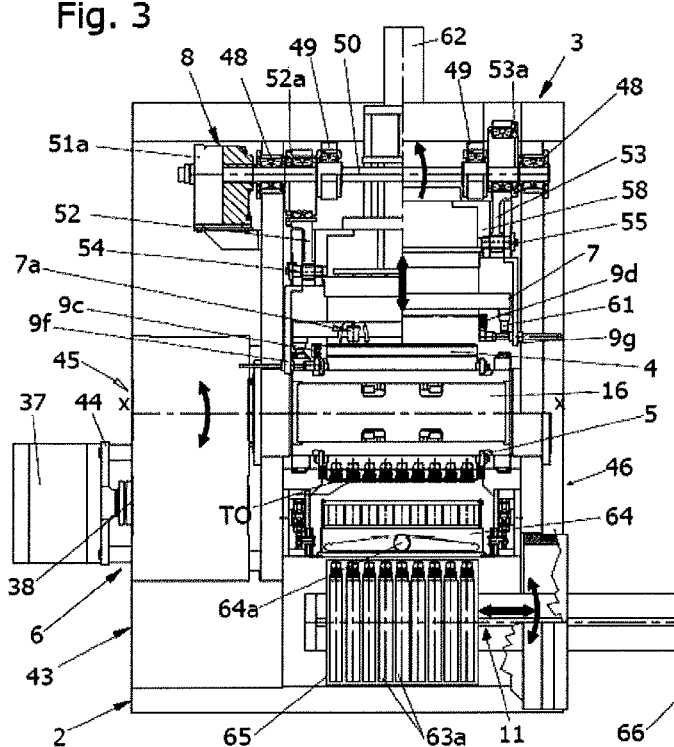
FIG. 3 is a side view from the right for an observer of the thermoforming press of FIG. 1 with the upper part relative to the male mold half in lowered molding position and half in raised stop position.
Figure 4:
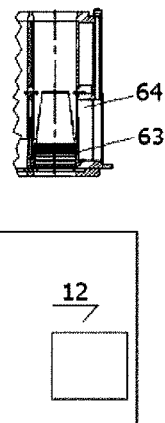
FIG. 4 shows a detail on an enlarged scale of FIG. 3.
Figure 5:
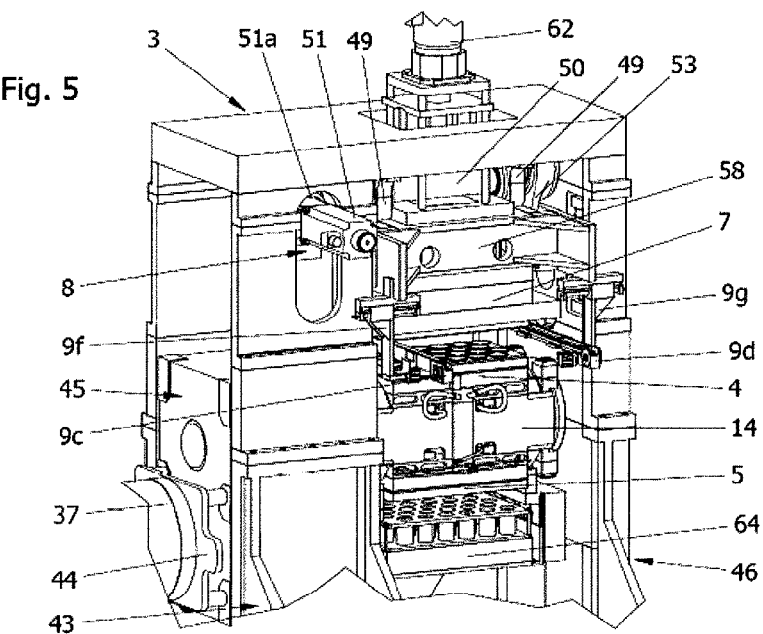
FIG. 5 is a partial perspective view of the upper part of the press of FIG. 3.
Figure 6:
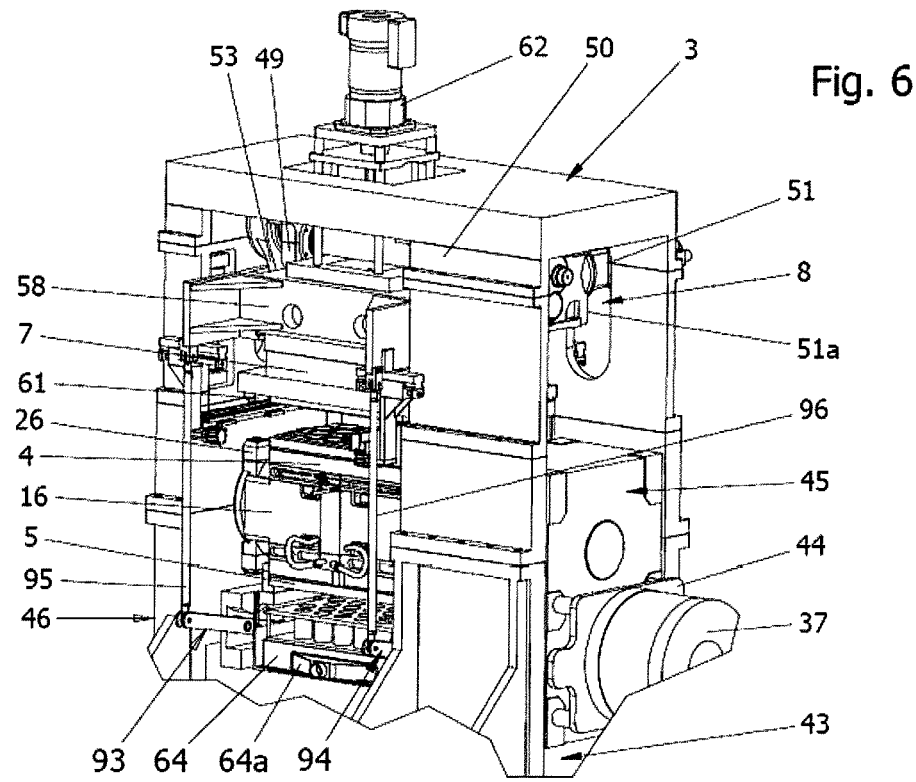
FIG. 6 is a partial perspective view similar to FIG. 5, but from the opposite front.
Figure 7:
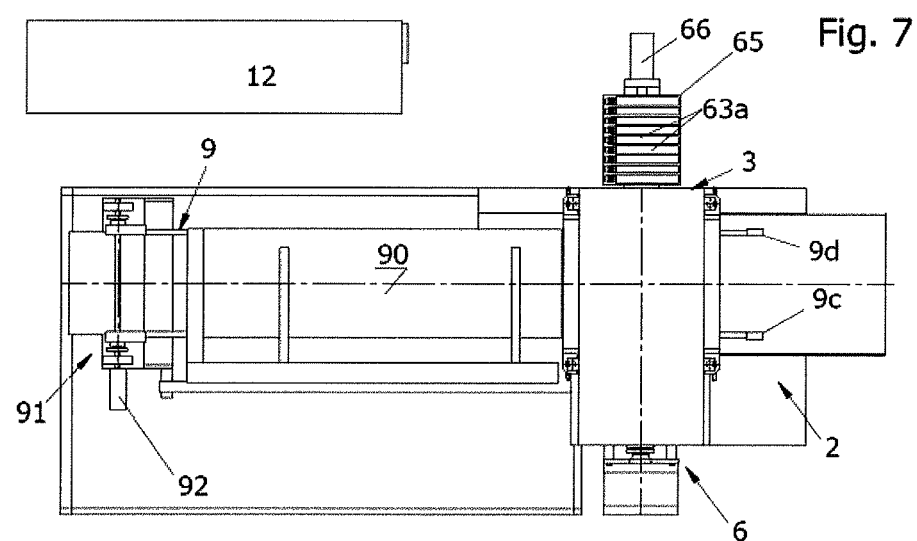
FIG. 7 is a plan view of the thermoforming press of FIG. 1.

First, with reference to FIGS. 1 to 7, a thermoforming press 1 according to the present invention is schematically illustrated which is suitable for thermoforming a thermoformable sheet material to obtain hollow molded objects, typically both disposable objects and packaging objects, such as glasses, bowls, vases, covers, tubs with or without cover, plates and the like. The thermoforming press 1 is constituted by a support base 2, preferably structured as a bridge, by an upper support frame 3 placed above the support base 2, by a pair of female molds 4 and 5, equal to each other, supported by the support base 2 in a manner such that they can rotate around a rotation axis x-x substantially horizontal, in use, by drive means 6 for the pair of female molds 4 and 5, by a male mold 7, equipped with at least one molding pad 7a and movably supported on top of the pair of female molds 4 and 5 in said upper support frame 3; and by drive means 8 for the male mold arranged to lift it and lower it in sync with the angular travels of the female mold pair.

Preferably, the thermoforming press 1 comprises a feeder group 9 upstream, of any suitable type, designed to intermittently and synchronously feed a sheet material 9a into a zone between the pair of female molds 4 and 5 and the male mold 7 by means of a suitable motion transmission group 91 controlled by a suitable stepper motor 92.

Advantageously, the sheet or belt 9a is supported in its engagement section in the press zone 1 by a pair of slide and support guides 9c and 9d, which are constrained to supports 9g and 9f in a suitable kinematic connection with the mold holder 58 which supports the male mold 7 on the lower part thereof.

Partly in the support base 2 and partly on the side thereof, means are provided for stacking 10 and removing 11 the thermoformed objects TO from the thermoforming press 1. The stacking and removing means can be of any suitable type. In a suitable position, preferably outside the thermoforming press 1, a cabinet 12 is also provided for housing an electrical panel (including a CPU or program control unit), in a manner such that it is easily accessible by an operator.

Figure 12:
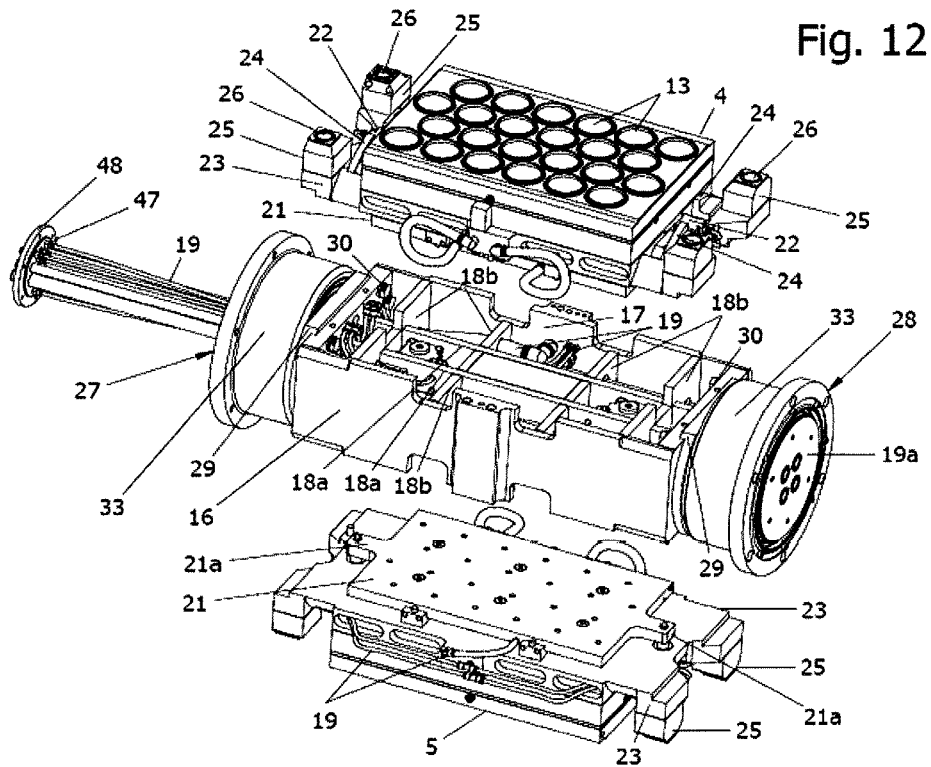
FIG. 12 is an exploded view of the female molds and the intermediate support element.
Figure 13:
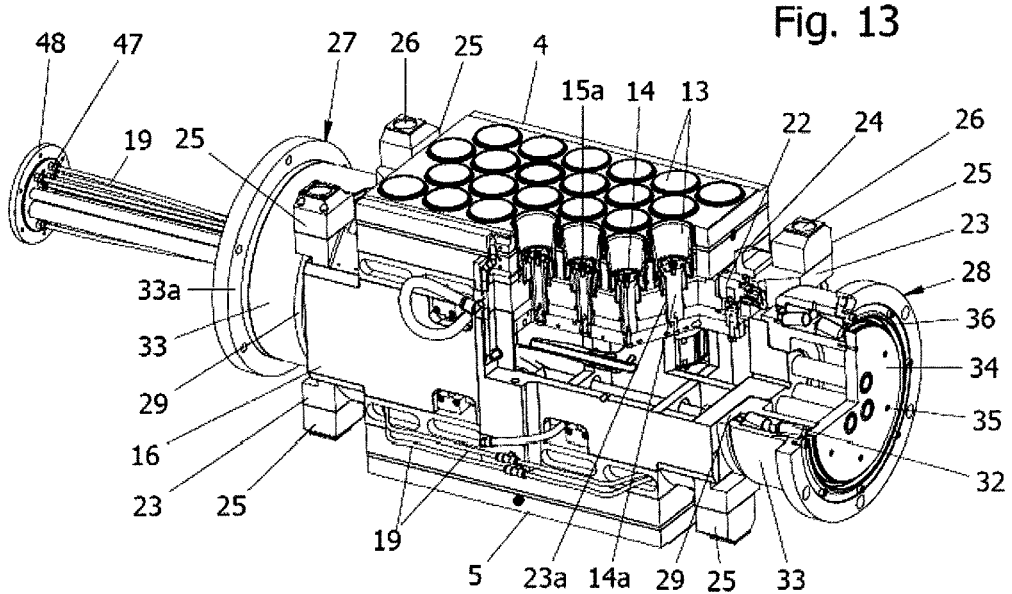
FIG. 13 is a perspective view similar to that of FIG. 11, but with parts in section.
Figure 14:
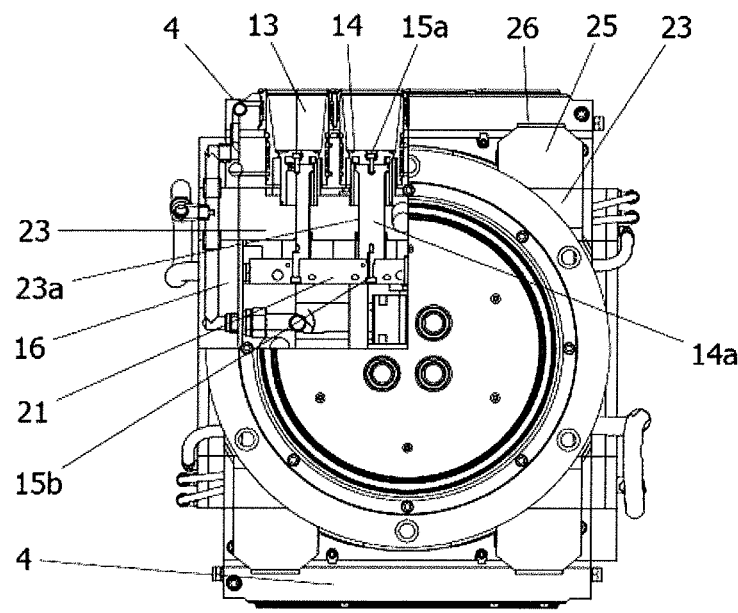
FIG. 14 is a lateral view of the female molds and the intermediate support element of FIG. 12 and with parts in section.

As is better illustrated in FIGS. 8 to 15, the female molds 4 and 5 are arranged diametrically opposite with respect to the rotation axis x-x and are structured in a manner that is standard for the state of the art, i.e. they both have one, or usually several thermoforming cavities or seats 13. Typically, the thermoforming cavities 13 have a depth such to be able to mold thermoformed objects having a maximum height of 215 mm (8.5 inches). Each thermoforming cavity 13 is equipped with a movable bottom 14, preferably in the shape of an overturned glass, which on the opposite side with respect to the respective cavity 13 is fixed, e.g. by means of suitable Allen screw 15a, to the end of a control stem 14a (FIGS. 13 and 14).

In use, the female thermoforming molds 4 and 5 must be maintained at temperature and for such purpose a labyrinth of channels for a fluid are formed therein, preferably thermoregulated with a cold fluid (water), as is standard practice at the state of the art.

In the embodiment illustrated in FIGS. 1, 3 and 12 to 14, a support member or mold holder 16 is provided between the female molds 4 and 5, such member/holder being designed to ensure the contribution of a completely safe structural rigidity against deformations under stress and greater practicality for arranging interlocking components for the molds. The support member 16 is advantageously obtained via assembly of longitudinal and transverse components made of light alloy, as will be further described below, or as a single piece obtained via casting.

As better seen in FIG. 12, the mold holder member 16 advantageously has hollow parallelepiped structure delimiting at least one space or compartment 17, preferably a plurality of compartments separated by longitudinal 18a and transverse 18b ribs and open towards the two opposite faces thereof, designed to support a respective female mold 4, 5. In the various compartments of the mold holder member 16, various accessory components can be arranged, such as ducts 19 for a feed circuit of a cold cooling fluid for the female molds and for a pneumatic circuit.

Whether the mold holder member 16 is provided or not, each female mold 4, 5 is equipped with a respective plate 21, termed bottom plate, against which the other end of the control stems 14a is abutted; such stems are fixed to said plate by means of bolts 15b, with the interposition of a respective platform 23, which for such purpose has a corresponding plurality of through holes 23a for receiving and guiding the control stems 14a (FIG. 13).

On the side opposite the bottom plate 21, a female mold 4, 5 abuts against the platform 2, 3, such mold being removably fixed to the platform, e.g. by means of a plurality of suitably distributed fixing screws (not shown).

Figure 15:
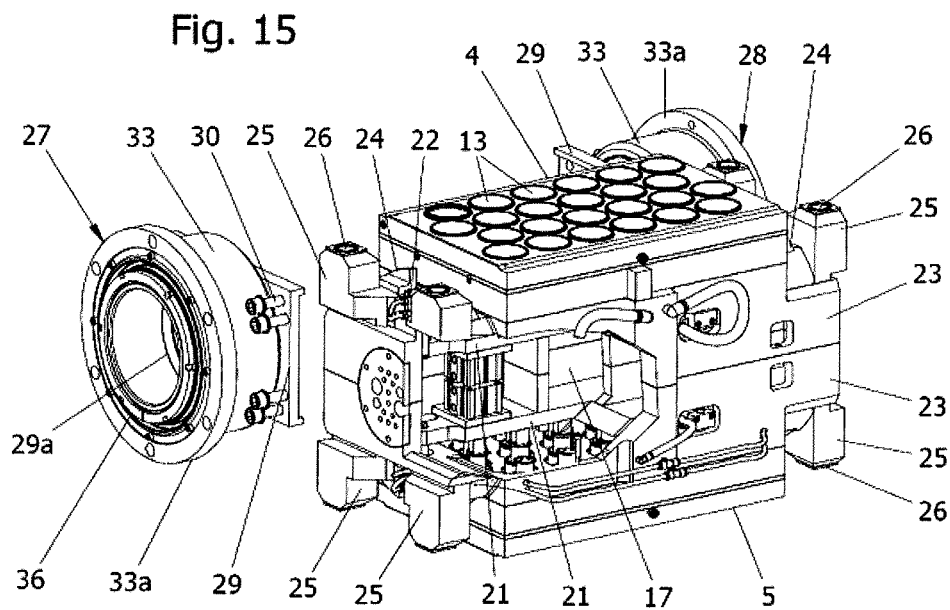
FIG. 15 is similar to FIG. 11, but regards an embodiment of rotating element with two female molds without intermediate support element.

The bottom plate 21 has smaller bulk than the female molds 4, 5 and is supported by the respective platform 23 with the freedom to carry out small approaching-moving away displacements with respect to its respective female mold 4, 5; this in order to control corresponding small travels of the movable bottoms 14 from a work position towards the mouth of the respective thermoforming cavity 13, so as to carry out the extraction-expulsion of the thermoformed object in the cavity 13 before returning into its work position. For such purpose, the plate 21 can, for example, have two extensions or appendages 21a aligned in the direction of the rotation axis x-x and each fixed, e.g. bolted, to a respective stem of a pair of simple or double-acting pneumatic jacks 22 designed to control the plate 21 to carry out the above-described movements. In the embodiment of FIG. 15, the bottom plate 21 of each female mold 4, 5 remains housed in a suitable notch or seat provided in the respective extended platform 23, whereas when the mold holder member 16 is provided, the plate is advantageously housed in the mold holder member, in which case the platform 23 can have lower thickness. In addition, one of the spaces 17 for receiving the accessory interlocking components for the female molds 4, 5 remains delimited between the platforms 23 and the mating lateral walls of the platforms 23.

At two opposite ends thereof, e.g. close to each roller or slide block 24, each platform 23 also supports a fixed block or appendage 25, in which a centering notch or hole 26 is obtained whose function will be further explained below.

Laterally, the female mold pair 4 and 5 (FIG. 15) or the mold holder member 16 (FIG. 13) has two opposite support hubs 27 and 28 aligned and concentric with the rotation axis x-x. As an example, each hub can include an idle flange for abutment and terminal attachment 29 fixed in any suitable manner, e.g. via bolts 30 (FIG. 12), to the end of the mold holder member 16 (FIG. 13) or to the two facing and opposite platforms 23 (FIG. 15).

At the external face of each abutment flange 29, a cylindrical hub 29a is abutted, integral therewith, on which a suitable bearing 32 is fit, e.g. a roller bearing. On the bearing 32, a flanged bushing 33 is inserted with terminal flange 33a directed in the opposite direction with respect to the flange 29, so that an engagement groove is delimited between the flange 29 and the flange 33a, as will be further explained below.

A retaining and cover disc 34 is abutted against a small internal edge of the flanged bushing 33, such disc 34 being fixable in position by bolts 35 which engage the cylindrical hub 29a of the abutment plate 29. Around the disc 34, a ring is arranged for rotary seal 36, anchored to the flanged bushing 33.

Figure 16:
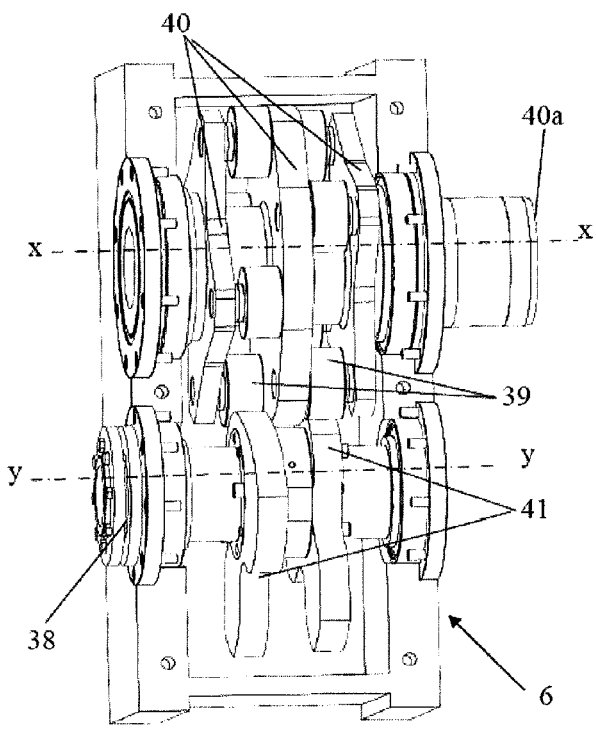
FIG. 16 shows a detail on an enlarged scale of FIG. 8 regarding transmission means between the primary power drive shaft and the controlled or secondary shaft.
Figure 17:
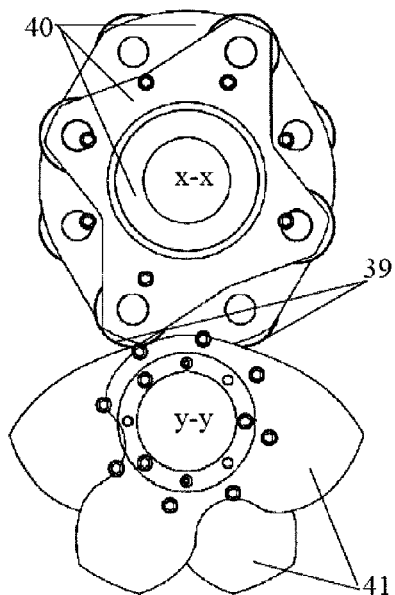
FIG. 17 schematically illustrates a high-performance cam transmission means making up part of the transmission means of FIG. 8.

The drive means 6 of the rotatable element formed by the female molds 4 and 5 and possibly by the mold holder member 16 comprise a rotary motion source, preferably of reversible type, typically a brushless torque electric motor 37 (FIGS. 3 and 16) controlled by the control panel 12, having an output or primary power drive shaft 38, and transmission means for the motion suitable also for acting as a torque reducer-positioner group. The transmission means comprise (FIGS. 16 and 17):

a double-profile cam 41, which advantageously has a stop angle of 45° and a work angle of 315° and is engageable via rolling friction with the band of rollers 39, so as to transmit the motion from the primary power drive shaft 38 coaxial with the rotation axis y-y to a secondary shaft 40 connected by means of a flange 40a to the cylindrical hub 29a of the flange 29 coaxial with the rotation axis x-x and designed to drive the pair of female molds 4 and 5 in rotation.

With such transmission means, between the primary power drive shaft 38 and the hubs 27 and 28 (axis x-x), there is an angular displacement ratio of 405°/180°, such that the pair of female molds 4 and 5 is made to complete a sequence of 180° angular travels in order to angularly move each female mold between an upper molding position, at which at least one thermoformed object TO is molded therein, and a lower discharge position for the extraction of said at least one thermoformed object TO thermoformed therein. Advantageously, in order to obtain such condition, a reversible motion source is provided, suitable for carrying out a sequence of angular travels in an alternating manner between molding position and discharge position, i.e. to-and-fro along the two rotation directions, as will be further specified below.

Figure 8:
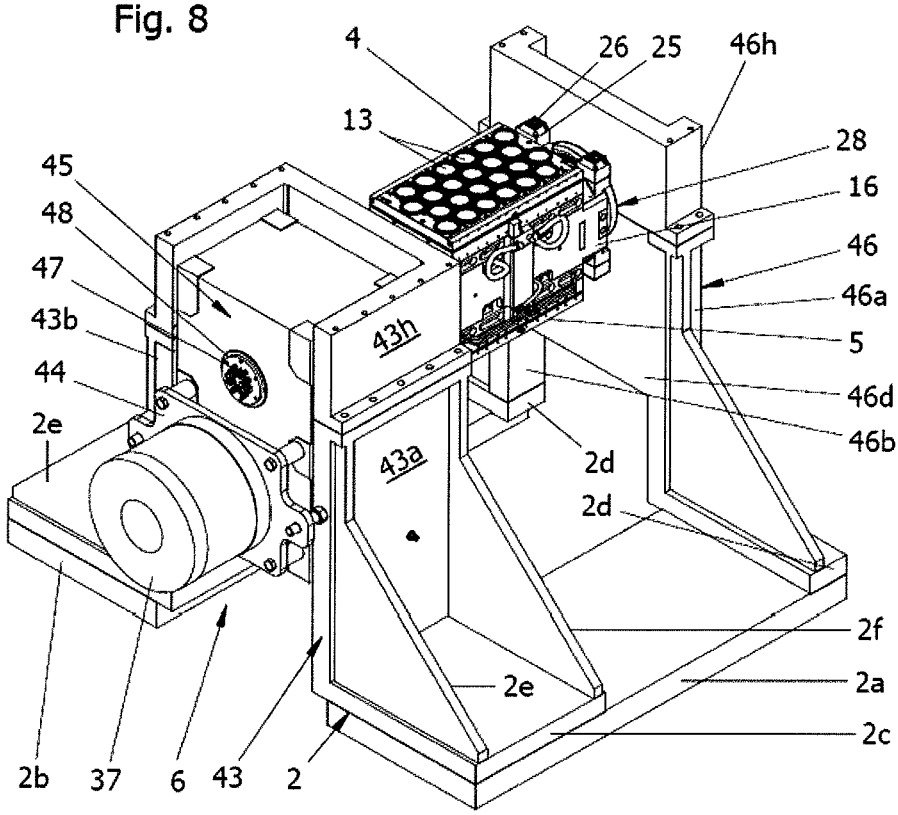
FIG. 8 is a perspective view of the base, of the female mold pair supported by the base and the drive and transmission means for the female mold pair.
Figure 9:
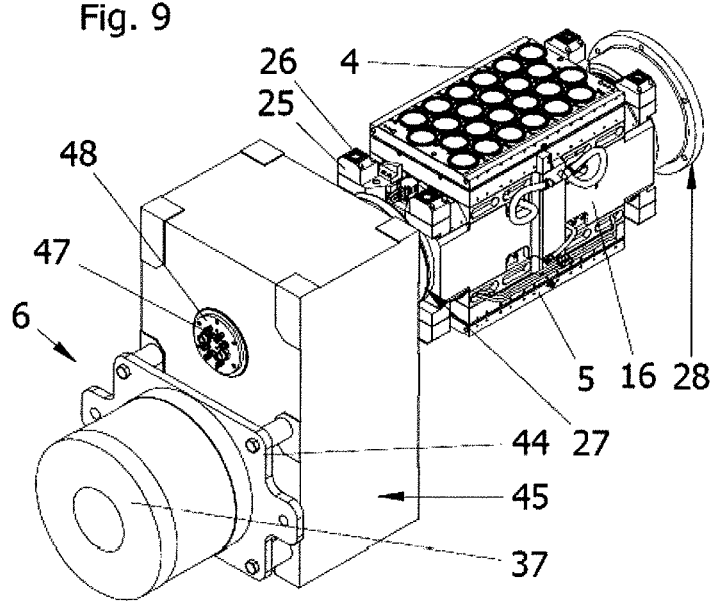
FIG. 9 illustrates the female mold pair with intermediate support element and the drive and transmission means of FIG. 8 on an enlarged scale.
Figure 10:
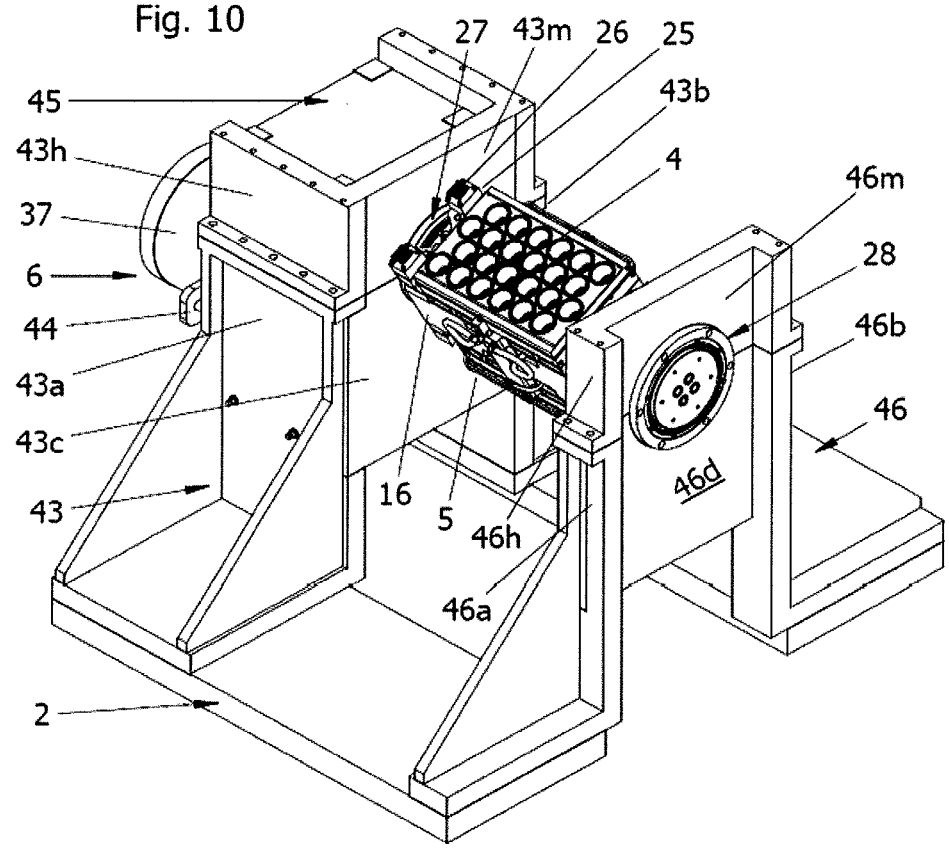
FIG. 10 is a view similar to FIG. 8, but in another position and from the opposite side.
Figure 11:
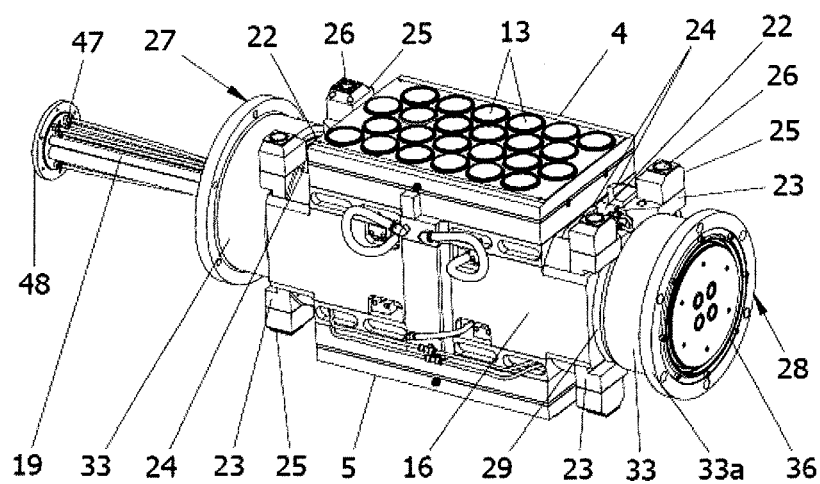
FIG. 11 is a perspective view on an enlarged scale of the pair of female molds and the intermediate support element.

The drive means 6 are preferably supported in a box-like flank 43 upwardly extending from the base 2 (FIGS. 3-10). Preferably, the base 2 is formed (FIG. 8):

by a pair of ground support and anchorage plates 2a, 2b typically with rectangular plan, arranged spaced and parallel to each other longways;

by four feet: two wider 2c and two narrower 2d (only two feet are visible in FIG. 8), for anchoring to a respective plate 2a, 2b;

by the box-like flank 43 constrained and upwardly extending in any suitable manner from the pair with wider feet 2c and, for example, comprising a pair of large plates 43a and 43b upwardly extending at the two facing ends of the feet 2c and each preferably stiffened by a pair of counters 2e and 2f, e.g. welded both to the respective foot 2c and to the respective large plate 43a, 43b; the flank 43 also comprises a crosspiece 43c (the latter visible in FIG. 10), which together with the large plates 43a and 43b delimit a receiving and support seat for the torque reducer-positioner group, generically indicated with 45 in FIGS. 8 and 9; and by a flank 46 substantially parallel to the flank 43 and constituted, for example, by two uprights 46a and 46b each upwardly extending at the two facing ends of the feet 2d and rigidly connected by a crosspiece 46d (FIG. 8).

Outside the flank 43 and the torque reducer-positioner group 45, a support plate 44 is fixed, e.g. bolted, designed to overhangingly support the stator of the electric motor 37 in any suitable manner.

Advantageously, the flanks 43 and 46 have the upper section thereof, respectively 43h and 46h, removably anchorable, e.g. via bolting at respective flanged portions, to the top of the lower section. The upper sections 43h and 46h constitute an extension of the respective lower section and have a crosspiece thereof, respectively 43m and 46m. In the zone between the crosspieces 43c and 43m, on one side, and 46d and 46m, on the other, a respective through opening is obtained, typically half in cradle shape in the lower crosspieces 43d and 46d and half shaped as a cap, the latter being removable via assembly-disassembly of the hubs 27 and 28, respectively, which remain engaged at the respective flanged bushing 33. The rotatable element formed by the female molds 4, 5 and possibly by the mold holder member 16 is thus mounted in line around the axis x-x, with its hub 29 in meshing engagement with shaft 40 by means of the flange 40A of connection with the cam 41 of the positioner group 45.

Along and inside the torque reducer-positioner group 45 along the axis x-x, a plurality of interlocking ducts 19 for the female molds 4 and 5 are also extended, the ducts preferably leading to a series of quick connections, generically indicated with 47 in FIGS. 8 and 9, respectively for the connection to the feed circuit of a cold fluid (water) for the female molds 4 and 5 and for a pneumatic circuit designed to power various uses, such as the expulsion of the thermoformed objects TO and the driving of the pneumatic jacks 22. The quick connections 47 are advantageously assembled on a support plate 48 fixed to a wall of the reception space of the shaft 40 of the positioner group 45. The quick connections 47 are connectable to the flange 29 by means of the tubes 19, which are received in the opening of the hollow shaft 40 of the positioner group 45.

The male mold 7 is equipped with one or more pad elements, as is normal at the state of the art, i.e. one pad element 7a (FIG. 3) for each thermoforming cavity 13 provided in the female molds 4, 5. The pad element is slidably mounted and controllable by the linear actuator 62, such that it can be controllably engaged with a female mold 4, 5, when the latter is situated in upper molding position, and be removed from the female mold before the latter begins its angular displacement directed towards its discharge position.

The support frame 3 for the male mold 7 is preferably supported at the top of the flanks 43 and 46 of the support base 2.

In the upper part of the frame 3, a control shaft 50 is mounted for rotation, typically by means of a plurality of roller bearings 48 and 49, such control shaft 50 having rotation axis substantially parallel to the axis x-x. The control shaft 50 is driven by a servomotor 51, by means of a suitable reducer 51a, controlled by the control panel 12 in sync with the drive means 6 and the motor 92, which in turn controls the feeder group 9. On the control shaft 50, the head of a pair of spaced connecting rods 52, 53 is mounted for rotation; the foot thereof is articulated to a respective articulation pin 54, 55 borne by a respective pair of tabs 56, 57 upwardly projected from a mold-holder frame 58 which supports the male mold 7 on the lower part thereof. The male mold 7 can be fixed to the mold holder 58, for example, by means of six screws. The mold holder 58, when the control shaft is rotated, can typically complete a travel, preferably fixed or predetermined, of 150 mm—approaching (lowering) or moving away from (lifting) a female mold 4, 5 situated in upper molding position.

The regulation of the mounting parallelism between the molds (in the direction of the foil width) is executed by adjusting two eccentric flanges 52a and 53a integrated in the connecting rods 52, 53. Typically, medium adjustments can be made, e.g. +/−0.02 mm. The setting of the coupling level between male mold 7 and female molds 4, 5 is carried out by acting on the eccentric pins 54, 55 of the foot of the connecting rods 52, 53 by means of the rotation of the same.

The mold holder 58 is vertically guided by four guides or columns 59 (FIG. 1) with the interposition of bushings 60, preferably made of ceramic or tungsten carbide in the slide contact zone. From the male mold 7, four pins 61 are downwardly extended (FIG. 4), designed to be engaged, e.g. by penetrating about 45 mm, in a respective hole 26 on an underlying female mold 4, 5.

The driving of the control shaft 50 and thus of the pair of connecting rods 52, 53 designed to raise and lower the male mold 7 occurs in sync with the angular travels of the pair of female molds 4, 5, such that the male mold is engaged with the underlying female mold stopped in upper molding position, and is removed therefrom before the angular displacement of the female mold towards the discharge position.

The driving of the in-mold cutting means, for separating the objects thermoformed therein from the scrap 9b, is the same as that used for raising-lowering the male mold 7, since the shearing action occurs at the conclusion of the final closure section of the male-female molds. The in-mold cutting system is of any suitable type, preferably with penetrating matrix-punch elements.

The stress or load for closing the male 7 and female molds 4, 5 is transmitted to the rotatable element mainly at the hubs 27 and 28, where these are housed in the respective bearings 32, but also through the lateral slide blocks or bearings 24, preferably of a micro-adjustable type, which contributes to reducing to a minimum the bending deformations of the entire rotatable element (female molds 4, 5 and possibly the mold holder member 16).

The extraction of the thermoformed hollow objects TO takes place in the lower discharge position of the respective female mold 4, 5, i.e. with the mouth of the thermoforming impressions 13 and the mouth of the objects TO thermoformed therein directed downward. For such purpose, the jacks 22 make the respective bottom plate 21 move close to the female mold 4, 5 in discharge position; the bottom plate 21 pushes the stems 14a and thus the bottoms 14 towards the outside, with such action removing the thermoformed objects TO from their thermoforming impressions 13. The jacks 22 also have the function of maintaining the bottom plate 21 in stable position during the angular travels of the rotatable element, opposing and neutralizing the centrifugal force thereof, which otherwise would cause a premature expulsion of the objects TO. The objects TO, once removed, fall outside the female mold, being directed towards an underlying container or stacking cage 64 for the formation of small stacks 63 of objects TO.

If desired, it is possible to employ pneumatic ejection or expulsion via feeding dry compressed air on the bottom of each thermoforming cavity 13, using several ducts 19 for controlling suitable means dedicated for such purpose and of any suitable type.

Preferably, in order to speed up the fall of the thermoformed objects TO, reduced pressure is created in the stacking container 64 by means of the collector 64a, so that the outgoing speed from the mold of the thermoformed objects TO is comparable to that of a shot object. The thermoformed objects are preferably stacked, first in small stacks 63 (FIGS. 1 and 3) and subsequently in a further stacking cage 64 situated immediately below the lower discharge position of the female molds 4 and 5, which is kinematically connected to the leverage system 93 and 94 in order to be moved in sync with the mold holder 58 connected thereto by means of the connecting rods 95 and 96. Once the expected number of objects in the stacks 63 has been reached, the thermoformed objects TO are transferred from the stacking cage 64 to a containment cage 65 of greater capacity arranged below the stacking cage 64, which suitable for receiving and containing stacks 63a of length equal to a multiple of the length of the stacks 63 formed in the stacking container 64. Once loaded, the containment cage 65 is moved laterally with respect to the thermoforming press 1 by means of a motorized linear transfer system 66 and is subsequently rotated 90°, e.g. by means of a pinion and rack device 67, for horizontally arranging the stacks 63 of objects contained therein and then transferring them, e.g. via a pusher of any suitable type, to a removal conveyor, e.g. of belt type, not shown in the drawings.

The above-described thermoforming press 1 is suitable for completing a very high number of thermoforming cycles over time, as well as ensuring an extended in-mold stabilization for the thermoformed objects TO before their extraction. Indeed the extraction takes place during the thermoforming cycle following that in which the objects were thermoformed, i.e. a stabilization typical of a cycle called "shuttle" in jargon. The functioning of the thermoforming press 1 is described hereinbelow with reference to the diagrams illustrated in FIGS. 19 and 20.

Figure 20:
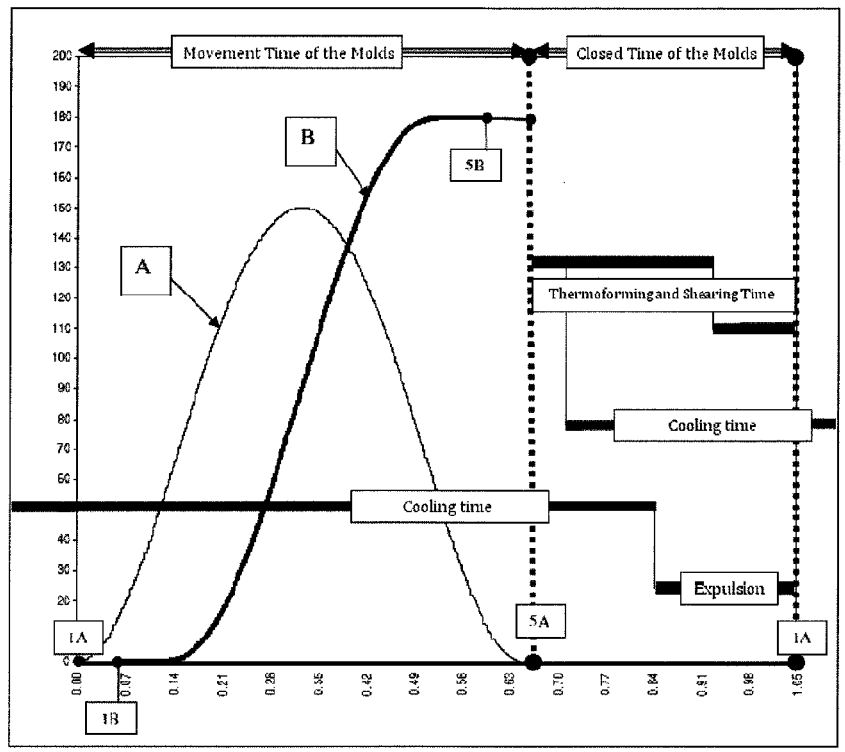
FIG. 20 is a diagram which illustrates a thermoforming cycle of 1.05 sec at a productive rhythm of 57 cycles/min with a thermoforming press according to the present finding.

In the diagram of FIG. 20, the curve A describes the sinusoidal progression of the opening-closing movement or travel of the male mold 7 controlled by the electric motor 51, which drives the pair of connecting rods 52 and 53, while the curve B describes the progression of the angular displacement of the female molds 4, 5 controlled by the torque motor 37 during an angular travel thereof, e.g. in clockwise direction, during a first thermoforming cycle. During the time period from 0 (position 1A) to 0.65 sec (position 5A), the rectilinear movements of the upper male mold 7 are synchronously carried out together with the angular displacements of the pair of female molds 4 and 5 and the advancement movement of the foil to be thermoformed.

From 0.65 sec (position 5A) to 1.05 sec (position 1A), the thermoforming is carried out in a female mold with in-mold cutting of the thermoformed objects TO, while the in-mold cooling time or structural stabilization time of the material of the thermoformed objects is extended for most of the subsequent thermoforming cycle in the other female mold until extraction (expulsion) of the objects themselves.

In the subsequent cycle (entirely similar to that described above), after the stopping of the motor 37 and during the stop, in which the female mold situated in upper thermoforming position is engaged by the male mold, the motor 37 reverses its rotation direction and repeats the above-described cycle.

Figure 21:
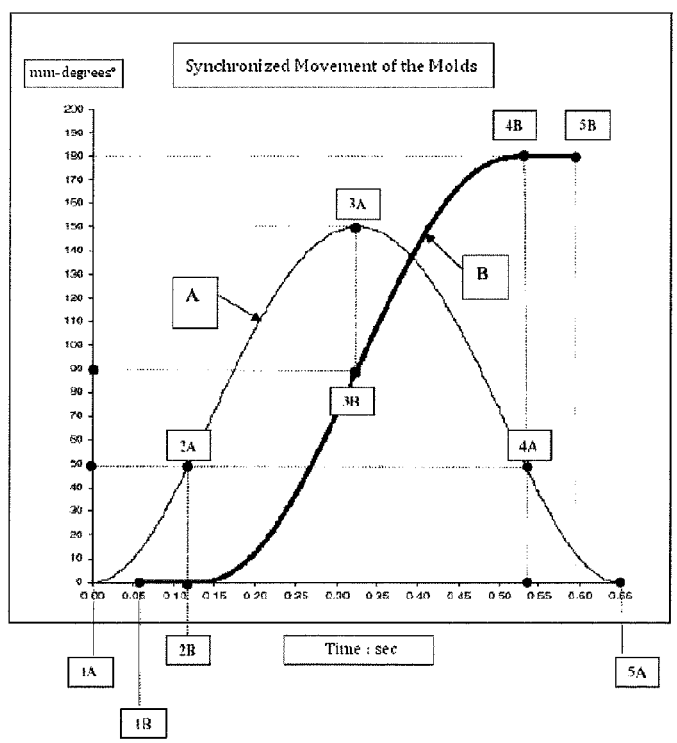
FIG. 21 is a diagram that illustrates the synchronization of the movements of the female mold pair and of the male mold during a thermoforming cycle.

The graph of FIG. 21 is a portion of the graph of FIG. 20 and shows in detail the phasing points of the displacement motion of the molds: male 7 (curve A) and female 4 and 5 (curve B), within a predetermined execution time scale. At point 1A of the curve A, there is the start of the motor 51 in order to start the opening travel of the upper male mold 7. At time 1B, the motor 37 and hence the primary drive shaft 38 are started, while at time 2B corresponding with point 2A, the male mold 7 has already carried out an opening travel of 48 mm (point 2A). At the latter point, at time 2B, the 180° rotation movement begins of the secondary shaft 40 with axis x-x driven by the cam 41. At time 3B=3A, the male mold 7 has completed its maximum removal travel of 150 mm from a female mold 4, 5 (considered in upper molding position), whereas the rotating pair of the female molds has completed a 90° angular travel. At time 4B=4A, the motor 37 continues its rotation, while the 180° angular travel of the secondary output shaft 40 around the axis x-x of the female mold pair 4, 5 terminates (point 4B of the curve) and at the same instant the male mold 7, in approaching or closing movement, lies 48 mm from the underlying female mold already in upper thermoforming position.

The distance of 48 mm (point 4A of the curve A) at which the male mold 7 comes to be situated corresponds to the preceding distance at point 2A; at point 4A, the four pins 61 which constrain the male mold to the underlying female mold 4, 5 are still completely unthreaded or free from the respective guide bushing 26 (but are about to be constrained), whereas at point 2A the same are still constrained, but are about to be released. At point 5B (0.595 sec) of the curve B, the stopping of the motor 37 and thus of the primary drive shaft 38 occurs, and the male mold 7 is still situated at a certain distance (in closing phase) from the underlying female mold 4, 5.

At time 5A (0.65 sec), there is the stopping of the drive motor 51 of the male mold 7 and the start of the stop provided for the thermoforming operations; at the end of such operations, the next cycle is begun. The time interval from 0 to 650 msec constitutes the time period, during which the thermoforming molds (female 4, 5 and male 7) remain open, i.e. are not in mutual engagement.

For a clearer description of the kinematic system 6, i.e. the parallel-axis transmission means with double-profile cam 41 and rollers 39 between primary power drive shaft 38 and secondary controlled shaft 40 (with reference to the curve B), the following characteristics are underlined.

At time 1B, with the start of the motor 37, the primary drive shaft 38 controls the cam 41, which in the first 45° of angular displacement (so-called stop angle of the cam 41) does not transmit the motion to the shaft 40. The function of the stop angle (section 1B-2B) and consequent time interval (in the illustrated case, 60 msec) is to allow the motor 37 to be able to accelerate its inertial masses (rotor of the motor itself, main drive shaft 38 and cam 41) starting from zero speed up to a pre-established speed (in the present example 125 g/min). The torque that the motor 37 must provide, therefore, is usually that required for this purpose. In other words, the motor 37 must not also rotate the remaining rotating masses associated with the secondary rotation shaft 40.

Once the acceleration phase is finished (point 2A=time 2B), when the primary drive shaft 38 is rotating at the pre-established speed of 125 g/min, the double-profile cam 41 for the remaining 315° of round angle transmits the acceleration to a series of rollers 39, in order to make the secondary shaft 40 complete an angular travel of 180° (point 4B of the curve B). In the section 2B-4B, the cam 41 of the primary drive shaft 38 carries out an angular travel of 315° at constant speed (125 g/min, and for a time of 420 msec), driving the secondary shaft 40 in rotation, which then completes an angular travel of 180°.

Of fundamental importance in this phase (2B-4B) is the contribution of the available kinetic energy, due to the masses already in rotation after the motor 37 acceleration step; in this phase, the motor 37 is only designed to provide the necessary torque for overcoming the inertia connected with the secondary shaft 42, i.e. of the rotating group formed by the female molds 4, 5.

In the section 4B-5B, the angular displacement of the secondary shaft 40 having been completed, there is the braking of the rotation of the masses referred to the primary drive shaft 38, whereas the motor 37 in order to reach its complete stop (point 5B) utilizes the additional 45° of rotation of the double-profile cam 41; such 45° constitute the stop angle portion of the cam 41, such portion presents itself again once a complete rotation of 360° has been carried out. Such operation is possible, because in order to perform the subsequent angular displacement, the motor 37 reverses its rotation direction.

The above-described motion transmission therefore allows optimizing the acceleration, speed and torque values, since the first 45° of a round angle are exploited, within which a complete movement cycle must occur for the acceleration, and the subsequent 315° are used for maintaining operation at constant speed, whereas the first 45° of the subsequent round angle (in the same direction) are used for stopping.

The angular displacement of 180° of the secondary shaft 40, i.e. of the pair of female molds 4, 5, is exclusively controlled by exploiting the 315° rotation of the cam 41. This is done to ensure a high-precision positioning of the molds, optimizing the torque on the motor 37 with split into two different phases and obtaining a torque reduction of 315°/180° on the primary drive shaft 38, which allows employing a motor 37 of relatively small size.

A further torque reduction is obtained since the kinetic energy of the flywheel mass of the transmission members (rotor of the motor 37 included) is exploited and utilized for the rotation motion (angular travel of 180°) of the rotating pair formed by the female molds 4, 5 and by the possible mold holder member 16, in addition to overcoming the external friction induced by the rubbing of the rotary seal rings to ensure the seal against leaks of lubricant used in the rotating supports.

The positioning precision, which constitutes a fundamental requirement in the coupling alternation of the female molds 4, 5 with the male mold 7, is ensured due to the fact that the angular travel of 180° is exclusively controlled by the cam 41, independent of the level of precision of the motor 37 rotation; the positioning precision is also ensured since the rollers 39, which are preloaded on the contact surface with the cam 41 and hence lack clearances, have a radius Rr, e.g. 275 mm, greater than the radius Ri (e.g. 254 mm) referred to the center of gravity of the sum of the rotating masses, such that they do not allow elastic position amplifications. The yield of the transmission means or torque reducer-positioner group, due to only rolling transmission contacts (unlike currently-used precision gear reducers), is advantageously on the order of 98.5%.

As is known, in order to have a good optimization of the movement of the female mold pair 4 and 5, it is necessary that the moment of inertia Jr of the rotating mass be as small as possible. The value of Jr with reference to the rotation axis x-x depends, at least in a first approximation, on the product of the sum of the masses of the rotating bodies (i.e. the total mass m) and the square root of their distance Ri from the axis x-x, according to the formula $Jr = m \times Ri^2$.

The rotating masses are then optimized with respect to size and weight, but it is also necessary to provide for a structuring of the same, which ensures minimum elastic bending under the molding load compatible with a minimum distance Ri from the axis x-x. Hence, the selection must fall on materials with low density and high elastic modulus, such that the elastic deformation under load of the rotating element does not exceed acceptable values, e.g. it does not exceed 0.04 mm.

Figure 18:
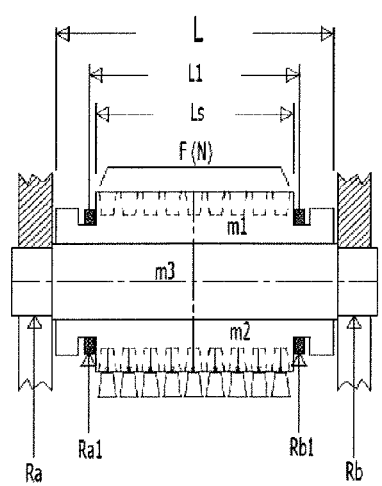
FIGS. 18 and 19 are a schematic front elevation view and a schematic side view, respectively, of the female molds and the intermediate support element.
Figure 19:
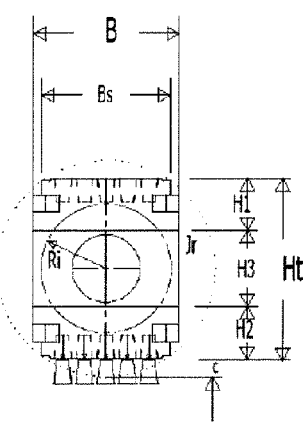

FIGS. 18 and 19 schematically illustrate a practical embodiment of a rotating element, i.e. two female molds 4 and 5 plus an intermediate support element 16, where:

m is the total mass given by the sum of the masses m1=m2=470 kg of the female molds 4 and 5, Ra=Rb indicate the reaction of the main bearings 32 against the structure of the flanks 43 and 46, Ra1=Rb1 indicate the further redundant reaction of the adjustable slide blocks or rollers 24 against the structure of the flanks 43 and 46, H1=H2 indicates the thickness of the female molds 4 and 5, Ht is the total thickness of the entire rotating element, Ls=770 is the frontal width of the forming zone of the molds, L=1220 mm indicates the distance between the main supports of the female molds, L1=800 mm indicates the distance between the supports of the adjustable slide blocks or rollers 24 applied on the female molds 4 and 5, Bs=480 mm is the width of the forming zone in the advancement direction of the foil, B=500 mm is the width of the female molds in the advancement direction of the foil, Jr=0.94 kg×m² is the total mass moment of inertia (resultant of the above-indicated masses subjected to the dynamics in question) referred to the axis x-x, and F(N)=600,000 N is the maximum closure force distributed on the surface of the female mold situated in upper thermoforming position, typically necessary for molds having the aforesaid dimensions.

The production capacities of a thermoforming press 1 according to the present invention (indicated hereinbelow also with the abbreviation OMV mod. RS77 for the sake of brevity), due to the effect of the attainable high speed dynamics and the favorable thermoforming cycle (as illustrated by the diagrams of FIGS. 20 and 21), resulted quite high and much greater than those of the conventional thermoforming presses in the same market area; all of such presses being based on techniques of thermoforming and in-mold cutting, as well as collecting the thermoformed objects in stacks.

The reference thermoforming presses (with forming and cutting in the mold) are: TFT mod. FT700, TFT mod. FT900, ILLIG mod. 75K (presses that function with "tilting movement"), OMV mod. F87 and OMV mod. E76 (press that employs the "shuttle system"), all well known to a skilled person in the art.

Comparing the available production data of a typical product on the market, such as a disposable 200-230 ml cup made of polypropylene with weight of 2.5 g, with thermoforming time (400-450 msec) substantially equal for each press model, it is immediately clear that there is a macroscopic production capacity difference between the various thermoforming press types, as set forth in the following Table.

TABLE

| Press | Thermoforming cavities | Cycles/min | Pieces/h |
| --- | --- | --- | --- |
| TFT mod. FT700 | 32 | 41 | 78720 |
| TFT mod. FT900 | 57 | 34 | 116280 |
| ILLIG mod. 75K | 50 | 40 | 120000 |
| OMV mod. F87 | 72 | 28.5 | 123120 |
| OMV mod. E76 | 60 | 29 | 104400 |
| OMV mod. RS77 | 51 | 57 | 174420 |

From the values reported in the Table, it is clearly inferred that the press RS77 according to the present invention has a production capacity at least 40% greater than any other of the same type.

The above-described thermoforming press 1, as specified above, is also suitable for ensuring an in-mold stabilization of the thermoformed objects TO before their extraction, the stabilization time being longer than that available in prior art thermoforming presses.

As it is well known to a person skilled in the art, the longer the in-mold stabilization time in each working cycle, the higher the quality of the thermoformed objects TO in terms of:

definite dimensions, within given tolerances, depending on the final use of the thermoformed objects;

absence, in the thermoformed objects, of distortions, non-planarity, etc., especially at the edges thereof; and uniformity in the crystalline structure of the thermoformed objects TO.

FIGS. 22 and 23 show two subsequent working cycles of two different thermoforming presses. More particularly, FIG. 22 shows two subsequent working cycles of a press known in the art, wherein two female molds are moved laterally to-and-fro (rectilinear movement or shuttle system) with respect to a press zone where a male mold is arranged to move vertically up and down (also termed straight shuttle system). FIG. 23 shows two subsequent working cycles of a thermoforming press according to the present invention (indicated in FIG. 23 as rotary shuttle system).

Both Figures illustrate the following time intervals:

Cy.T."A" (Cycle Time A)=time interval required for molding and cutting an object "A" and extracting an object "B";

Cy.T."B" (Cycle Time B)=time interval for molding and cutting an object "B" and extracting an object "A";

M.O.T (Mold Opened Time)=time interval or dead time of a working cycle wherein the mold is open;

M.C.T (Mold Closed Time)=time interval of a working cycle wherein the mold is closed, and one object (A) is thermoformed (and cut) and the other object (B) is extracted;

Sh.Mov."A" (Shuttle Movement for object A)=time interval wherein an empty female mold for object "A" is moved to a molding position and the female mold containing a thermoformed object "B" is moved to a discharging position;

Sh.Mov."B" (Shuttle Movement for object B)=time interval wherein an empty female mold for object "B" is moved to a molding position, and the female mold containing a thermoformed object "A" is moved to the discharging position;

C1 (Mold closed Cooling Time)=time spent for cooling and stabilizing the thermoformed objects while the molds are closed (i.e. during the time interval M.C.T). It will be noted that it is during such a time interval that most of the stabilization process occurs. The inner and outer surface of the thermoformed objects TO, or at least part of it, is actually in direct contact with the mold (male/female) cold surfaces as shown in FIG. 24.

More particularly, the edge ED of each thermoformed object TO is in direct contact with both the male 7 and female (4, 5) mold relatively cold surfaces. Since the material of each thermoformed object to be stabilized in the edge area has a greater thickness than in the sidewall or bottom thereof, the cooling effect on each thermoformed object edge due to contact with both the edge of the male mold and the female mold results in a permanent desired stabilization of the crystalline structure in the thermoformed material.

The sidewall and bottom of each thermoformed object TO is, on the other hand, in contact with the relatively cold surface of the female mold only.

Figure 24:
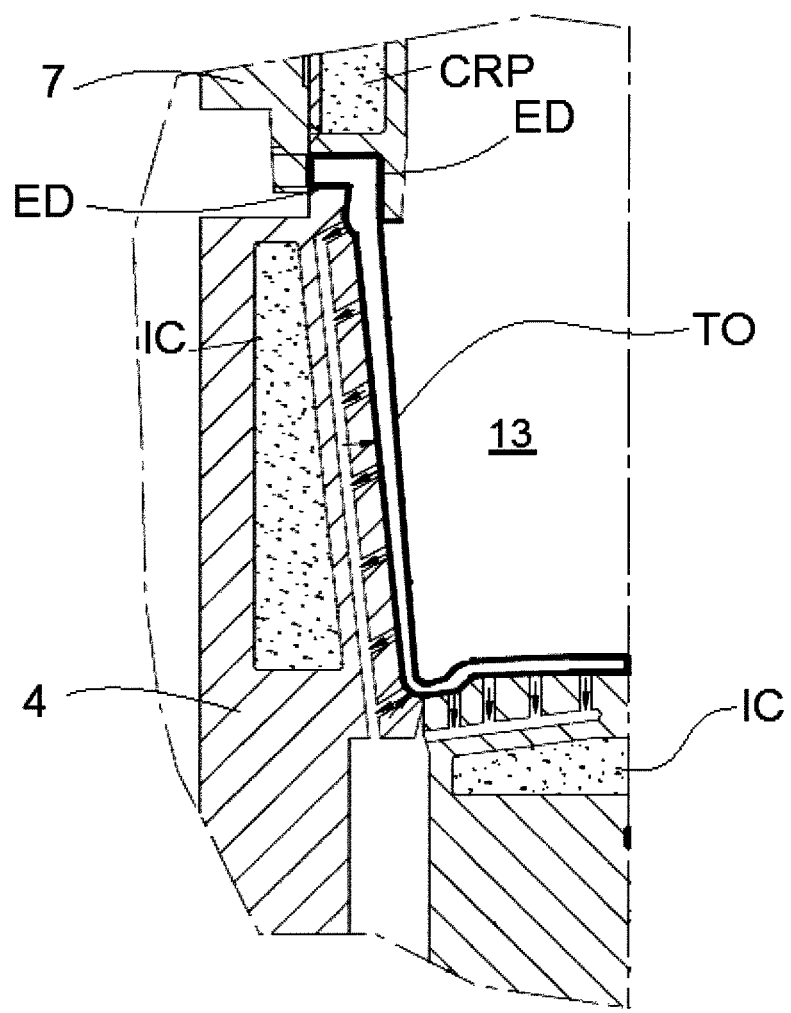
FIG. 24 shows a cross-section view of a thermoformed object being formed in a thermoforming cavity of the press according to the present invention and, in particular, a cooling system provided at a thermoforming cavity in the female and male molds.

FIG. 24 illustrates an object being thermoformed in a thermoforming cavity. The cooling system provided in the female mold is indicated with IC, while the cooling system provided in the male mold is indicated with CRP. Both cooling systems are of any suitable type, e.g. a type known in the art, and are designed to provide a uniform cooling for the thermoformed objects, thereby obtaining a uniform crystalline structure therein.

Accordingly, the stabilization process of the thermoformed objects TO is achieved through direct contact under pressure with relatively cold surfaces of the molds and is further promoted by the combined effect of pressure on their sidewall and bottom exerted by the processing pressurized air and vacuum applied to each thermoforming cavity 13 during the time interval C1 while the molds are closed onto one another.

C2 (Total Cooling time)=time interval wherein the thermoformed objects are in contact, held by vacuum, with their respective thermoforming cavities 13. C2 comprises time interval C1 and time interval M.O.T., and the time interval until the objects are extracted from their respective female mold at the discharging position. C2, as it will be noted, is greater than the sum of M.O.T. and M.C.T.

Given the same working conditions for the two presses of FIG. 22 and FIG. 23, e.g. the same working cycle of 2 sec. and the same dimensions and weight of the molds (male and female):

the ratio between time intervals M.O.T. and M.C.T. is 2 to 1 with the prior art press and is inverted, to about 1 to 2 with the thermoforming press according to the present invention, in the exemplified case of a working cycle of 2 sec. In the thermoforming press according to the present invention, the time interval in a working cycle wherein the molds are closed (M.C.T.) is then much longer than that provided by the prior art press, since the time required for moving the female molds from the molding position to the discharging position (and vice versa) is much shorter.

The longer the M.C.T. interval in a working cycle, the longer the cooling time C1 in the press according to the present invention. It will be noted that with a thermoforming press according to the present invention the time interval C1 is almost twice as long as the corresponding time interval with the prior art press.

The longer C1, the longer C2. With a thermoforming press according to the present invention also time interval C2 is substantially longer than that of the prior art press.

The man skilled in the art will appreciate that the stabilization of the thermoformed objects obtained with a thermoforming press according to the present invention is comparable to that required to obtain mold-injected objects.

By comparing FIGS. 22 and 23 it will be appreciated that that with a given M.C.T. time interval during which the molds are closed, and given reduced Sh.Mov."A" and Sh.Mov."B" time intervals associated with a thermoforming press according to the present invention, the number of cycles/min that can be performed by the thermoforming press can be higher or even much higher than with the prior art thermoforming presses. The efficiency of the thermoforming press according to the present invention is thus remarkably increased in terms of production and product quality.

The above-described invention is susceptible to numerous modifications and variations within the protective scope defined by the contents of the claims.

Thus, for example, a thermoforming press 1 can be placed in line with edging, punching, marking and similar machines for thermoformed objects, as is normal practice at the state of the art.

The invention claimed is:

1. A press for thermoforming a thermoformable sheet material for obtaining at least one thermomolded object, which has
    a support base;
    a pair of female molds supported for rotation around a rotation axis on said support base, the female molds of the pair having at least one thermoforming cavity or seat formed therein, such molds being arranged diametrically opposite with respect to said rotation axis, drive means for said pair of female molds, which comprise:
    a rotary motion source designed to drive a power drive shaft and transmission means designed to transmit the motion from the power drive shaft to said pair of female molds, whereby between power drive shaft and female mold pair there is an angular displacement ratio of an angle greater than 360°, preferably 405°/180°, in order to make the female mold pair complete a sequence of 180° angular travels, thereby angularly and sequentially move each female mold into a molding position, at which at least one portion of said sheet material is thermoformed into a respective hollow object, and into a discharge position for the extraction of said at least one thermoformed object;
    a support frame extending from said support base;
a male mold movably supported in said support frame at said pair of female molds and having at least one molding pad element designed to engage a respective thermoforming cavity provided in each female mold;
    drive means for the male mold suitable for moving it open-closed in sync with the angular travels of said pair of female molds, thereby making the male mold sequentially engage with a female mold when the latter stops in said molding position, and removing the male mold from the female mold before an angular displacement thereof towards the discharge position, and program control means for said drive means,
    wherein each female mold comprises a respective platform, in which a plurality of through holes are formed,
    a movable bottom in each thermoforming cavity equipped with a respective control stem extending into a through hole of said platform, a bottom plate movably mounted on a respective platform on the opposite side with respect to the respective female mold and against which the other end of the control stems is abutted, and linear drive means supported by said platform whereby the bottom plate is caused to move close to-away from said platform thereby causing a corresponding movement of the bottoms.

2. A thermoforming press according to claim 1, wherein said pair of female molds are—supported for rotation around a rotation axis that is substantially horizontal in use.

3. A thermoforming press according to claim 2, wherein said drive means is suitable for raising and lowering said male mold in sync with the angular travels of said pair of female molds.

4. A thermoforming press according to claim 1, wherein said control stems are secured to said bottom plate.

5. A thermoforming press according to claim 1, wherein between the bottom plates of the female mold pair, at least one space is provided for receiving accessory interlocking components for the molds.

6. A thermoforming press according to claim 1, wherein between the platforms of said female mold pair, a support or mold holder member is provided.

7. A thermoforming press according to claim 6, wherein said support or mold holder member is hollow for delimiting therein at least one space for receiving accessory components.

8. A thermoforming press according to claim 1, wherein each female mold is supported by a plurality of slide blocks or lateral rollers anchored to a respective platform and designed to abut against the support base.

9. A thermoforming press according to claim 6, wherein each platform has a plurality of centering notches at two opposite ends thereof.

10. A thermoforming press according to claim 6, wherein said pair of female molds or said mold holder member has a pair of opposite hubs in line with the rotation axis of the female molds.

11. A thermoforming press according to claim 6, wherein said pair of female molds or said mold holder member has a pair of opposite hubs in line with the rotation axis of the female molds and, wherein each hub comprises an abutment flange or plate (29) fixed to the end of the female molds or the mold holder member, a hub member fixed to said abutment plate, a bearing means supported by said hub, a bushing arranged around the bearing means and delimiting an engagement zone in the support base.

12. A thermoforming press according to claim 1, wherein said rotary motion source is of reversible type, designed to reverse the rotation direction after each rotation of about 405°.

13. A thermoforming press according to claim 1, wherein said rotary motion source is designed to drive an output or power drive shaft and said transmission means act as a torque reducer-positioner group comprising two parallel axes and a cam having, in a round angle, a 45° stop angle and a remaining 315° work angle.

14. A thermoforming press according to claim 13, wherein said torque reducer-positioner group comprises: a support plate or wheel fit on the power drive shaft and having rotation axis coaxial with the power drive shaft, a band of rollers mounted for rotation on the support plate or wheel and distributed thereon along an ellipse with center on the rotation axis of the support wheel, said cam member being engageable with the rollers for transmitting the motion from the power drive shaft to a hub controlled in line with the rotation axis in order to drive the pair of female molds in rotation.

15. A thermoforming press according to claim 14, comprising:
a control shaft mounted for rotation in the frame with a rotation axis substantially parallel to the rotation axis of said pair of female molds, a servomotor group driven by said program control means, a reducer coupled to the servomotor group, a mold-holder frame which supports said male mold and at least one connecting rod having its head mounted for rotation on the control shaft and its feet articulated to a respective articulation pin anchored to said mold-holder frame, whereby with the rotation of the control shaft, the mold-holder and the male mold complete an approaching or moving-away travel in sync with the angular travels of the female mold pair thereby making the male mold controllably to engage with a female mold situated in its molding-position, and to remove the male mold from the female mold before being angularly moved towards the discharge position.

16. A thermoforming press according to claim 14, comprising:
a control shaft mounted for rotation in the frame with a rotation axis substantially parallel to the rotation axis of said pair of female molds,
a servomotor group driven by said program control means,
a reducer coupled to the servomotor group,
a mold-holder frame which supports said male mold
at least one connecting rod having its head mounted for rotation on the control shaft and its feet articulated to a respective articulation pin anchored to said mold-holder frame, whereby with the rotation of the control shaft, the mold-holder and the male mold complete an approaching or moving-away travel in sync with the angular travels of the female mold pair thereby making the male mold controllably to engage with a female mold situated in its molding position, and to remove the male mold from the female mold before being angularly moved towards the discharge position, and comprising a plurality of guides or columns for guiding said mold-holder.

17. A thermoforming press according to claim 1, comprising in-mold cutting means in said female molds, such means being controlled by said drive means.

18. A thermoforming press according to claim 1, wherein said base is structured as a bridge.

19. A thermoforming press according to claim 18, wherein said base has at least one portion thereof removably fixed to the rest of the base and designed to support said frame.

20. A thermoforming press according to claim 14, comprising:
a control shaft mounted for rotation in the frame with a rotation axis substantially parallel to the rotation axis of said pair of female molds,
a servomotor group driven by said program control means,
a reducer coupled to the servomotor group,
a mold-holder frame which supports said male mold;
at least one connecting rod having its head mounted for rotation on the control shaft and its feet articulated to a respective articulation pin anchored to said mold-holder frame, whereby with the rotation of the control shaft, the mold-holder and the male mold complete an approaching or moving-away travel in sync with the angular travels of the female mold pair thereby making the male mold controllably to engage with a female mold situated in its molding position, and to remove the male mold from the female mold before being angularly moved towards the discharge position; and
a feeder group designed to intermittently feed said sheet material in sync with the movements of said male mold, into a zone between said female mold pair and said male mold where said sheet material is supported by a pair of slide guide means operatively connected to said mold holder.

* * * * *